United States Patent Office 3,293,143
Patented Dec. 20, 1966

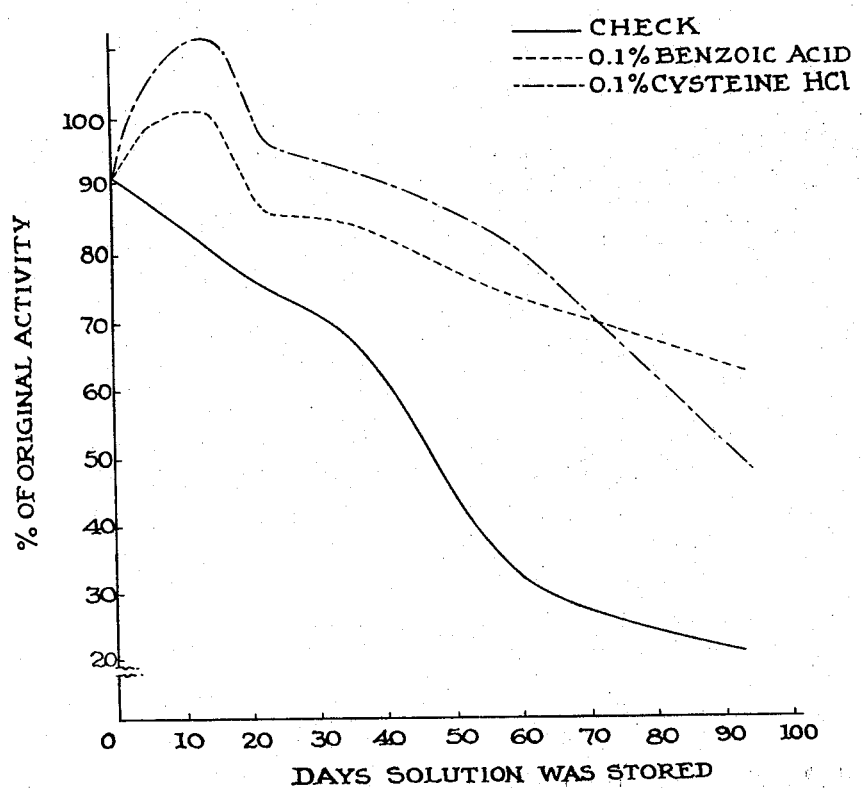
CHANGE IN THE PROTEASE ACTIVITY OF ENZYME SOLUTIONS STORED IN THE REFRIGERATOR FOR THREE MONTHS

3,293,143
STABILIZATION OF BROMELAIN
PREPARATIONS
Ralph M. Heinicke, Honolulu, Hawaii, assignor, by mesne assignments, to Castle & Cooke, Inc., Honolulu, Hawaii, a corporation of Hawaii
Filed Aug. 10, 1964, Ser. No. 388,356
13 Claims. (Cl. 195—63)

This invention relates to an improved process for the production of a proteolytic enzyme preparation from the stem of the pineapple plant of the family "Bromeliaceae," and more particularly the cultivated varieties thereof belonging to the species "*Ananas sativus*." Such preparations are usually referred to as "pineapple stem bromelain" or more simply as "stem bromelain." They comprise primarily a mixture of at least five proteases including bromelain, along with a wide variety of other enzymes as disclosed in my prior U.S. Patent No. 3,002,891 granted October 3, 1961. Other enzymes that have been identified include two acid phosphates, two peroxidases, alpha and beta amylases, cellulases, and a number of specific dehydrogenases.

Suitable methods of producing stem bromelain are set forth in the aforesaid prior patent. In general, these methods include first the extraction of an enzyme-containing juice by crushing or pressing the stems, usually with the addition of maceration water; second the separation and recovery from the juice of the proteinaceous material by suitable precipitation techniques; and finally drying the precipitated material in any suitable manner. In addition to enzymes, such dried precipitated material contains impurities including a number of different substituted phenols, some material apparently of the ubiquinone class, and about 20% inorganic salts.

Various procedures have been used heretofore for the purification of such material, in the course of research work on the properties of bromelain. Such research work has been concentrated on the study of one or more purified protease fractions, and the data obtained indicates that during purification of the enzyme fraction the total loss of protease activity can be quite large unless some protective agent is used such as cysteine, cyanide, or mercury. However, these agents have little value in the commercial production of bromelain, because of considerations of cost and toxicity.

For commercial purposes, it is important that materials added to stem bromelain not only be relatively inexpensive but also leave non-toxic residues. Also the enzyme preparation should be relatively stable for substantial periods as to activity, odor and appearance in order to provide time for handling and distribution to consumers under practical conditions. Since straight precipitation of stem bromelain from the juice with acetone or ammonium sulfate gives a low yield of product with poor stability, it was proposed in the above mentioned patent to improve stability by adding to the juice a reducing agent such as hydrogen sulfide, sulfide salts, or others including cyanide and hydroxylamine. The improvement thus effected is attributable to the facts that in order to obtain high yields of good enzyme, it is important to minimize oxidation reactions during the preparation of the enzyme, either caused by molecular oxygen or catalyzed by specific enzymes; and that sulfide ions and related materials can prevent both these types of oxidation and can also reduce certain oxidized materials. However, the use of sulfide-treating agents is subject to the disadvantages that the sulfide ions may be rapidly oxidized, that sulfide ions increase the iron content of the juice, and also that stock sulfide solutions are unstable and disagreeable to handle.

The primary object of the present invention is to produce greater yields of stem bromelain in a form which not only is more active than bromelain as heretofore prepared, but also has greatly prolonged storage life without undue loss of activity, change of color, or unpleasant odor.

Another object is to provide a new type of stabilizing agent for stem bromelain which can be used alone, but which is also compatible with sulfide-treating agents and other reducing agents and has a synergetic action therewith.

Further objects are to provide stabilizing agents as characterized in the preceding objects which are relatively inexpensive, non-toxic, and stable and easy to handle.

I have now found that the foregoing objects can be achieved by adding benzoate ion and related homologs to the enzyme preparation, either alone or together with conventional reducing agents or antioxidants, as illustrated by the following detailed description and examples. Benzoic acid, its salts, and homologous materials belong to a class of materials which are not effective antioxidants; in contrast to conventional reducing materials, benzoic acid has no effect upon oxidized metals or on disulfide bonds, nor does it act as a free radical poison. The action of the benzoate ion in stabilizing stem bromelain is therefore primarily preventive rather than ameliorative, and is believed to be due in large part to the inhibition of dehydrogenase enzymes in the preparation.

But whatever may be the correct theoretical explanation of its effectiveness, the stabilizing effect of benzoate ion lasts for a much longer time than the more ephemeral effects of such reducing agents as cysteine, sulfide, sulfite and other materials of this class, and for this reason it has great potential use in the long term stabilization of powder, solutions and pastes containing stem bromelain. On the other hand, where added during the preparation of the juice, the benzoate ion effectively lessens the oxidation which normally occurs, being substantially as effective in this respect as sulfide ions.

Moreover, since the action of benzoate ion is different from that of conventional reducing agents or antioxidants, it may effectively be combined with any other standard antioxidant or reducing agent. It may also be combined with antioxidants of the free radical poisoning type.

Benzoic acid and its salts have been used as bacteriostatic agents for many years. For this purpose the pH level must be such that a large percentage of the benzoic acid or salt is in the unionized form, since the ionized form is completely ineffective as a bacteriostat. In contrast, the benzoate ion is considerably more effective than the unionized form as a stabilizing agent for bromelain. Furthermore, relatively high concentrations of benzoate ion eliminate the very marked depressing effect on stability of pH values in the neighborhood of 6.0–7.0. At such pH in the presence of benzoate ion, bromelain actually has greater stability than it has at pH 4.5 without benzoate ion. These results have been unexpected and have been of great practical value for preparing solutions of enzyme or for fractionating the enzyme with a minimum loss of activity.

The benzoate ion, hereinafter referred to at times simply as benzoate, can be provided by the use of benzoic acid itself, or of any desired salt thereof capable of furnishing the ion under the conditions of use. Examples of other salts are the alkali metal salts including sodium, potassium and ammonium salts; calcium and magnesium benzoate, lithium benzoate.

As to homologs, the following are examples capable of furnishing benzoate such as salicylic acid, toluic acid isomers, phenylacetic acid, and the like.

The use of benzoate at any stage in the preparation of the enzyme is beneficial; for example, it may be added:

A. To the maceration water which is added to the pressed pineapple stems to increase the extraction of protein and enzyme.

B. To the separated or concentrated (e.g., precipitated) enzyme just before the final drying stage.

C. To solutions, ointments, emulsions or the like made from the finished enzyme preparation.

D. To enzyme solutions which are to be concentrated by evaporation.

The following examples illustrate the utility and efficacy of benzoate, furnished either by benzoic acid or by sodium benzoate, at the above-listed different points in the production and storage of stem bromelain. These examples were all based on the following general procedure. Pineapple stems harvested by a commercial pineapple stem harvester were crushed in a sugar roll, maceration water (1.5% NaCl solution) being added to the pressed residue at the rate of 50–100 gallons per ton of fresh stems to produce an enzyme-containing juice. This juice was treated with reducing agent as disclosed in my prior patent in order to recover a more acceptable quantity and quality of enzyme, the stabilizing agent being sodium sulfhydrate used at the rate of 1.5 to 3.5 grams per gallon (usually 2 gm./gal.) of total recovered juice. Except as otherwise noted, the pH of the juice was adjusted by adding phosphoric acid or sulfuric acid. The juice was then centrifuged and the enzyme preparation recovered, usually by precipitation with acetone, and then dried.

A.—ADDITION OF BENZOATE TO MACERATION WATER

Example A1

Table I shows the results of a series of tests in which benzoic acid alone, or together with sodium sulfhydrate, was added to the maceration water so that the juice was subjected to the stabilizing treatment prior to the extraction of the enzyme preparation therefrom by adding 400 ml. of acetone to one liter of centrifuged juice, filtering the mixture through diatomaceous earth-asbestos filter, and then adding one liter of acetone to the supernatant. The total precipitate was washed in dry acetone and vacuum dried.

Example A2

This treatment was the same as in Example A1, except that sulfuric acid was used to adjust the pH, that 1300 ml. acetone were used for the second precipitation step, and that the precipitates were all removed by batch centrifuging rather than filtering. Batch centrifuging normally causes less oxidation of the juice than does either filtering or continuous centrifuging. Hence, the sulfide treatments are more favored in these tests than in the ones reported in Table I, but the results again illustrate that benzoate alone is an excellent stabilizing material. The combination of benzoate and sulfide ions is again the best treatment.

B.—ADDITION OF BENZOATE ION TO THE ENZYME BEFORE DRYING

Since bromelain prepared by the standard procedure set forth above is quite stable, especially when tested over short time intervals, the addition of benzoic acid to the finished product just before the final drying step would not be expected to change appreciably the activity of the finished enzyme, except after relatively long periods of time. This is borne out by the data in Table III. However, if the enzyme is deficient in stabilizers, then Table IV shows that benzoic acid has a substantial stabilizing action, especially as to color.

Example B1

To the enzyme prepared by the above standard procedure, up to the step just before drying, various quantities TABLE I.—EFFECT OF BENZOATE ION AND SULFIDE ION ON THE ACTIVITY OF JUICE PRESSED FROM PINEAPPLE STEMS AND ON THE QUALITY AND QUANTITY OF BROMELAIN RECOVERED FROM THIS JUICE

| Treatment | Properties of Juice | | | Properties of Recovered Bromelain | | | | | |
|---|---|---|---|---|---|---|---|---|---|
| | MCU/ml.[1] | Mg. Protein N per ml. | MCU/Mg. PN | Yield[2] gm./1,000 ml. | Percent Insol. | Color[3] K.U. | GDU[1] | | |
| | | | | | | | Per gm. | | Total RSH |
| | | | | | | | No RSH | RSH[4] | |
| Standard but no sulfide | 2.11 | 0.105 | 20.2 | 2.67 | 19.7 | 135 | 70 | 105 | 280 |
| Standard plus 2 g. NaSH/gal | 6.20 | 0.137 | 45.3 | 2.54 | 14.1 | 15 | 210 | 280 | 711 |
| Benzoic acid 0.1%[5] | 5.10 | 0.143 | 35.6 | 2.90 | 21.5 | 19 | 280 | 350 | 1,016 |
| Benzoic acid+sulfide[5] | 9.80 | 0.155 | 63.2 | 3.67 | 21.5 | 130 | 280 | 280 | 1,027 |

[1] In this and subsequent table MCU and GDU are both measures of protease activity. The milk clotting method is a rapid assay technique and the gelatin digesting method a slower but more precise assay. One MCU is that amount of enzyme which will clot 5 ml. of a 5% standard milk solution at pH 5.3 and a temperature of 37.5° C. in one minute. One gelatin digesting unit (GDU) is that amount of enzyme which will liberate after 20 minutes of digestion at 45° C. 1 mg. of amino acid nitrogen from a 5% gelatin solution at pH 4.5.
[2] The yield of enzyme in this experiment is low since the small press used to squeeze out the juice was inadequate.
[3] The color stability (abbreviated "Color") is measured by preparing a 1% solution of the enzyme, adjusting to pH 7.0, centrifuging and then holding the enzyme at room temperature for 24 hours. The color of the juice is then read in a Klett colorimeter with a dark blue filter (#72). The low readings represent solutions having no color. Any reading above 75 is dark.
[4] In this and subsequent tables RSH refers to a sulfhydryl material used to activate the enzyme, specifically a 0.001 M cysteine solution (RSH). If no notation is made about RSH then the solution was assayed without cysteine activation.
[5] The benzoic acid was added directly to the maceration water, the sulfide to the recovered juice, plus maceration water.

TABLE II.—EFFECT OF SULFIDE ION AND BENZOATE ION ON THE QUALITY OF PINEAPPLE STEM JUICE ADJUSTED WITH SULFURIC ACID TO pH 4.0 AND ON THE YIELD OF ENZYME

| Treatment | Properties of Juice | | | Properties of Recovered Bromelain | | | | |
|---|---|---|---|---|---|---|---|---|
| | MCU/ml. | Mg P.N. per ml. | Yield 1,000 ml. | GDU | | | Color K.U. | Percent Insol. |
| | | | | Per gm. | | Total RSH | | |
| | | | | No RSH | RSH | | | |
| Standard but no sulfide | 11.6 | .34 | 7.38 | 735 | 1,050 | 7,750 | 108 | 4.7 |
| Standard plus 2 g. NaSH/gal | 50.0 | .36 | 8.54 | 1,400 | 1,450 | 12,400 | 20 | 2.8 |
| Benzoic acid 0.1%[1] | 45.8 | .38 | 9.60 | 1,085 | 1,160 | 12,100 | 129 | 3.2 |
| Benzoic acid+sulfide[1] | 56.2 | .38 | 8.93 | 1,365 | 1,420 | 12,700 | 17 | 2.8 |

[1] As in Table I, the benzoic acid was used in the maceration water, the sulfide was added to the juice plus maceration water.

of benzoic acid dissolved in acetone were added. The enzymes were then dried and assayed at different intervals. The results, shown in Table III, indicate substantially the same initial activity even up to 6% benzoic acid, but a 14% increase in stability after one month at levels above 0.17%.

TABLE III.—EFFECT OF DIFFERENT CONCENTRATIONS OF BENZOATE ION ADDED TO A WET ACETONE PRECIPITATE OF BROMELAIN ON THE STABILITY OF THE DRIED POWDER

| Mg. of Benzoic Acid Per Gram | Initial GDU/gm. | One Month GDU/gm. | Percent of Initial |
|---|---|---|---|
| 0 | 1,015 | 700 | 69 |
| 1.7 | 1,015 | 805 | 79.4 |
| 3.7 | 1,050 | 770 | 73.2 |
| 7.5 | 1,015 | 840 | 82.7 |
| 15 | 945 | 770 | 81.4 |
| 30 | 980 | 770 | 78.6 |
| 60 | 1,015 | 875 | 86.3 |

*Example B2*

Not shown in Table III is the lighter appearance of solutions made from enzyme containing benzoic acid, both initially and after storage. This is illustrated more fully in Example B2 and Table IV. Enzyme was made by the standard procedure except for the final drying step. The enzyme was washed several times in dry acetone to remove the natural antioxidant materials, after which a variety of compounds were added to the paste in acetone. These preparations were dried and then assayed at different time intervals. Table IV lists only a few of a large number of materials tested, those chosen representing three different classes of potential additives, namely, a nonionic surface active agent (Triton X–100), a free radical poison (butylated hydroxyanisole), and benzoic acid. Of this group of materials benzoic acid gave by far the best color and had excellent storage stability and solubility.

C.—ADDITION OF BENZOATE ION TO ENZYME SOLUTIONS, EMULSIONS AND PASTES

One of the problems in using any enzyme is that of preparing stable solutions, emulsions or pastes from the dried enzyme preparation. Loss of activity may be caused by autolysis, by specific inhibition of the enzyme, or by oxidation. Adding benzoic acid or its salts inhibits one specific form of oxidation. This is most dramatically illustrated by the excellent color of benzoic acid solutions as contrasted to the black color of the control.

*Example C1*

To a concentrated bromelain solution adjusted to various pH values with sodium hydroxide or sulfuric acid TABLE IV.—COMPARISON OF THE EFFECTIVENESS OF DIFFERENT ADDITIVES ADDED TO THE WET ACETONE PRECIPITATE BEFORE DRYING IN STABILIZING BROMELAIN PREPARATIONS

| Additive | One Week Storage | | | Three Months Storage | | |
|---|---|---|---|---|---|---|
| | GDU/gm. | Percent Soluble | Color K.U. | GDU/gm. | Percent Soluble | Color K.U. |
| Check | 1,155 | 86.8 | 109 | 875 | 84.5 | 114 |
| Butylated hydroxyanisole | 1,400 | 95.4 | 97 | 1,260 | 93.0 | 85 |
| Triton X-100 | 1,435 | 90.4 | 83 | 1,050 | 90.8 | 75 |
| Benzoic acid | 1,645 | 96.9 | 21 | 1,260 | 95.3 | 25 |

All additives used at the rate of 0.1 gram per 10 grams.

were added different concentrations of benzoic acid. The protease activity was measured over a twenty-four hour period by the milk clotting method. The data in Table V show that the stability and activity of bromelain and the effectiveness of benzoate as a stabilizing agent vary with pH.

TABLE V.—EFFECT ON DIFFERENT CONCENTRATIONS OF BENZOATE ION ADDED TO BROMELAIN SOLUTIONS ADJUSTED TO DIFFERENT pH VALUES ON ACTIVITY AND COLOR

| pH | Conc. of Benzoate, M[2] | MCU/ml | | | Color [1] 24 hr. Guaiacol |
|---|---|---|---|---|---|
| | | Initial | 3 hr. | 24 hr. | |
| 7.00 | .0001 | 57.3 | 42.9 | 0.6 | Dark. |
| | .001 | 59.0 | 46.8 | 22.7 | Do. |
| | .01 | 55.6 | 45.4 | 23.3 | Normal. |
| | .1 | 55.6 | 46.0 | 23.4 | Do. |
| 6.0 | .0001 | 48.7 | 33.6 | 0.8 | Dark. |
| | .001 | 50.5 | 33.8 | 0.8 | Do. |
| | .01 | 58.6 | 65.2 | 2.1 | Do. |
| | .1 | 58.6 | 74.3 | 54.4 | Normal. |
| 5.0 | .0001 | 103.4 | 117.2 | 87.0 | 99 KU. |
| | .001 | 103.4 | 118.6 | 104.2 | 68 KU. |
| | .01 | 103.4 | 117.5 | 113.2 | 63 KU. |
| | .1 | 104.9 | 117.5 | 115.4 | 57 KU. |
| 4.0 | .0001 | 116.2 | 120.0 | 101.7 | 105 KU. |
| | .001 | 123.4 | 120.0 | 113.2 | 93 KU. |
| | .01 | 119.0 | 118.6 | 115.4 | 58 KU. |
| | .1 | 116.2 | 118.0 | 116.3 | 44 KU. |
| 3.5 | .0001 | 114.9 | 123.2 | 91.0 | 92 KU. |
| | .001 | 101.9 | 123.5 | 112.7 | 66 KU. |
| | .01 | 104.2 | 123.5 | 122.0 | 73 KU. |
| | .1 | 102.0 | 122.4 | 121.0 | 77 KU. |

[1] To 5 ml. of enzyme were added 5 ml. of .001 M guaiacol solution at pH 5.0. The solution was held for 24 hours and the color then noted visually or read in a Klett colorimeter.
[2] M refers to the molarity of benzoate ion in the solution. A 1 M solution is equivalent to 12.2 g. of benzoic acid added to 100 ml. of solution adjusted to the values noted. Because of its greater solubility in water sodium benzoate is easier to use than benzoic acid. 1 M of sodium benzoate=144 g. compared to 122 g. for benzoic acid.

Stabilizing action is evident throughout the range of acid pH values. However, at pH 6.0 and above, the initial activity of the enzyme is relatively low, and relatively high concentrations of benzoate are required for stabilization both as to activity and color. For example, at pH 6.0 a concentration of 0.1 M (1.22% benzoic acid) was required for stabilization over 24 hours. At pH 7.0, a concentration of 0.01 M (0.12% benzoic acid) was sufficient to stabilize color over 24 hours but at this concentration and also at ten times as much benzoate (0.1 M), activity dropped during this same period from 55.6 to 23.3 MCU and to 23.4 MCU, about 40% of initial activity.

In contrast, initial activity at lower pH values (e.g., 5.0, 4.5, and 3.5) was nearly twice as great as at the higher pH range, and effective stabilization over a 24 hour period was obtained with benzoate concentrations as low as 0.001 M (0.012% benzoic acid), practically all of the initial activity being retained with satisfactory color.

*Example C2*

The stabilizing effectiveness of benzoate over longer periods of time is shown graphically in FIG. 1. To a concentrated bromelain solution adjusted to pH 4.5 were added various materials. The solutions were filtered through a bacteriological filter and then stored aseptically in a refrigerator for three months. The degree of retention of activity of the solutions is shown in FIGURE 1. Not shown on the figure is the color of the solution. At the end of three months all solutions were black except the benzoic acid treated enzyme.

D.—EFFECT OF BENZOATE ION ON THE ACTIVITY OF BROMELAIN SOLUTIONS CONCENTRATED IN A LOW TEMPERATURE EVAPORATOR

Concentrating bromelain solutions in a low temperature evaporator generally causes an appreciable loss of activity, and the loss can be especially high at pH values above pH 5.0. At lower pH values, however, the addition of benzoate ion results in higher recovery of enzyme and in a better product.

*Example D1*

Three liters of enzyme solution were concentrated to two thirds the initial volume in a low temperature vacuum evaporator operated at 95° F. and a vacuum of 28 inches. The results given in Table VI show clearly the beneficial effects of benzoate ion at pH values below 5.0.

TABLE VI.—EFFECT OF pH ADJUSTMENT AND BENZOATE ION ADDITION ON THE ACTIVITY OF BROMELAIN MADE FROM SOLUTIONS CONCENTRATED IN A LOW TEMPERATURE EVAPORATOR

| Properties | Treatments Check | Adj. to pH 4.5 with HCl | Addition of 0.01% Benzoic Acid |
|---|---|---|---|
| Final pH of solution | 5.35 | 4.55 | 4.75 |
| Final MCU of solution | 23 | 32 | 40 |
| Weight of Recovered enzyme, g | 39.5 | 50 | 47.5 |
| GDU/G | 385 | 665 | 840 |
| Color of enzyme powder | Darkest | Dark | Light |
| pH of a 1% enzyme solution | 5.4 | 4.65 | 5.0 |

*Example D2*

To determine how much benzoate is required to stabilize the enzyme three liters of enzyme solution were concentrated to two thirds of the original volume in the same equipment and under the same operating conditions as used in Table VI. The results shown in Table VII indicate that all three levels are satisfactory for stabilizing the enzyme.

TABLE VII.—EFFECT OF DIFFERENT LEVELS OF BENZOATE ION ON THE ACTIVITY OF BROMELAIN MADE FROM SOLUTIONS CONCENTRATED IN A LOW TEMPERATURE EVAPORATOR

| | Benzoic Acid Levels | | |
|---|---|---|---|
| Properties, percent | 0.025 | .05 | 0.1 |
| Final pH of Solution | 4.8 | 4.7 | 4.62 |
| MCU of Solution | 22.5 | 25.3 | 26.2 |
| Weight of recovered enzyme, g | 14.5 | 14.5 | 16.0 |
| GDU/g | 700 | 665 | 665 |

It will be seen from the foregoing description and from the data in the examples that benzoate ion, either alone or in combination with other reducing agents or antioxidants, is remarkably efficacious in providing increased yields of stem bromelain of increased specific activity and much greater stability over prolonged periods with regard both to retention of activity and prevention of color changes particularly darkening. As illustrated by the examples, benzoate can be added to the enzyme preparation during its extraction from the pineapple stems, or to ultimate commercial products in which it is embodied, or at any intermediate point in the processing of the enzyme between these extremes.

It will also be evident from the above data that the amount of benzoate ion is not critical, provided only that a certain threshold amount is used which produces an appreciable effect. In the case of "standard" solutions, as extracted from the crushed stems, this threshold amount may be as little as 0.01 M or 0.1% (about 1 gm./liter), especially in the preferred pH range below 6.0. With more concentrated solutions, the minimal amount of benzoate required becomes correspondingly less in terms of molarity. In proportion to the yield of precipitated enzymic material, the threshold amount of benzoate for effective action is about 0.1% by weight (dry basis). As clearly shown by Tables III and V, on the other hand, the amount of benzoate can be increased far beyond such threshold values without deleterious effects, but little or no added advantage is obtained above about 0.4–0.5% benzoate by weight of the dry solids recoverable from the solution and for most purposes 1% is a safe maximum.

It is to be expressly understood that the invention is not restricted to the details of the foregoing description and examples and that reference should be had to the appended claims for a definition of its limits.

What is claimed is:

1. In the production of enzymic preparations containing stem bromelain recovered from enzyme-containing juice expressed from crushed plants of the family Bromeliaceae, the method of stabilizing the enzyme against loss of activity and undesirable change of color which comprises admixing enzyme-containing material with an ionizable stabilizing agent which furnishes benzoate ion for stabilizing said enzyme.

2. The method defined in claim 1, in which said stabilizing agent and a reducing agent are admixed with said juice.

3. The method defined in claim 2, including the step of adjusting the pH of the juice to a value not greater than 5.0.

4. The method defined in claim 1, including the step of extracting said enzyme-containing juice from said crushed stems with the addition of maceration water, said stabilizing agent being added to said maceration water.

5. The method defined in claim 1, in which said stabilizing agent and a reducing agent are admixed with said enzyme-containing material.

6. The method defined in claim 1, in which enzyme-containing material is separated from said juice and said stabilizing agent is admixed with the separated material.

7. The method defined in claim 6 including the step of admixing a reducing agent with said enzyme-containing material after separation thereof from said juice but prior to drying thereof.

8. The method defined in claim 1 including the steps of incorporating said enzyme-containing material in an enzymic preparation adapted for commercial distribution and admixing said stabilizing agent with said enzymic preparation.

9. The method as defined in claim 8 wherein a reducing agent is admixed with said enzymic preparation along with said stabilizing agent.

10. The method defined in claim 1, wherein said stabilizing agent is admixed with an enzyme-containing solution and said solution is then concentrated by evaporation.

11. The method defined in claim 1 in which said stabilizing agent is benzoic acid.

12. The method defined in claim 1 in which said stabilizing agent is sodium benzoate.

13. An enzymic preparation characterized by high specific activity and stability against deterioration comprising the reaction product obtained by recovering stem bromelain from enzyme-containing juice expressed from crushed plants of the family Bromeliaceae and admixing the enzyme-containing material with an ionizable stabilizing agent which furnishes benzoate ion for stabilizing said enzyme.

References Cited by the Examiner

UNITED STATES PATENTS 3,002,891  10/1961  Heinicke _____ 195—66

A. LOUIS MONACELL, *Primary Examiner.*

L. M. SHAPIRO, *Assistant Examiner.*

UNITED STATES PATENT OFFICE
CERTIFICATE OF CORRECTION

Patent No. 3,293,143 December 20, 1966

Ralph M. Heinicke

It is hereby certified that error appears in the above numbered patent requiring correction and that the said Letters Patent should read as corrected below.

Column 8, lines 46 and 47, strike out "and a reducing agent are admixed with said juice." and insert instead -- is admixed with said enzyme-containing juice. --.

Signed and sealed this 12th day of September 1967.

(SEAL)
Attest:

ERNEST W. SWIDER
Attesting Officer

EDWARD J. BRENNER
Commissioner of Patents